UNITED STATES PATENT OFFICE.

JOSEPH BERLINERBLAU, OF SOSNOWICE, RUSSIA, ASSIGNOR TO DR. F. VON HEYDEN NACHFOLGER, OF RADEBEUL, GERMANY.

PARAPHENETOL-CARBAMIDE AND PROCESS OF MAKING SAME.

SPECIFICATION forming part of Letters Patent No. 489,728, dated January 10, 1893.

Application filed March 26, 1892. Serial No. 426,539. (Specimens.) Patented in Germany July 2, 1891, No. 63,485; in France August 13, 1891, No. 215,502, and in Belgium March 17, 1892, No. 98,840.

*To all whom it may concern:*

Be it known that I, JOSEPH BERLINERBLAU, a subject of the Emperor of Russia, and a resident of Sosnowice, Poland, Russia, have invented certain Improvements in the Manufacture of Paraphenetol-Carbamide and Paranisol-Carbamide, (for which I have obtained patents in France, No. 215,502, dated August 13, 1891, and patent of addition, No. 215,502, dated January 29, 1892; in Germany, No. 63,485, dated July 2, 1891, and in Belgium, No. 98,840, dated March 17, 1892,) of which the following is a specification.

My invention relates to the manufacture of para-phenetolcarbamide and para-anisolcarbamide.

The para-phenetolcarbamide

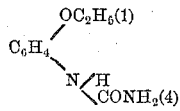

was first prepared by the inventor in the year 1883 from cyanate of potassium and hydrochloride of para-phenetidine, and forms a substance which has an extremely sweet taste and is innocuous when taken internally, thus appearing capable of being utilized in the arts as a saccharine matter that may serve as a substitute for sugar. This mode of preparation, however, is very expensive, and is dangerous on account of the poisonous properties of the cyanate of potassium, and, therefore, quite unsuitable for carrying into practice on a large scale. The process forming the subject of this invention is intended to remedy these defects. The said process is based essentially upon the formation of an intermediate combination

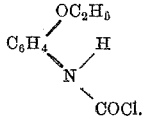

by means of one molecule of phosgene COCl$_2$ and two molecules of para-phenetidine

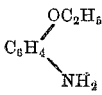

which intermediate combination or product produces with ammonia the para-phenetolcarbamide in theoretical quantity. The action of phosgene gas upon aniline may, moreover, cause the formation of double substitutes of urea, which would obviously have an influence on the yield. To augment the yield, it is requisite to operate with solutions that are not too concentrated and to avoid heating the reaction. Hence the para-phenetolcarbamide is best prepared according to this invention in the following manner: One kilogram of para-phenetidine is dissolved in a suitable solvent, for instance in from two to three times its quantity of benzol or toluol, this solution being gradually poured into 2.5 kilograms of a twenty per cent solution of phosgene in benzol or toluol. There separates forthwith hydrochloride of phenetidine which is filtered from the solution after a certain time has elapsed (preferably after from one-half to one hour) according to the following equation:

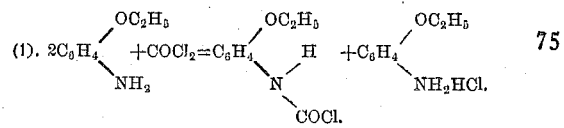

To the filtrate is added or into the same is introduced such quantity of ammonia (NH$_3$) as calculated to correspond to two molecules of ammonia (NH$_3$). The filtrate may also be shaken in an aqueous solution of ammonia. The reaction takes place according to the following equation:

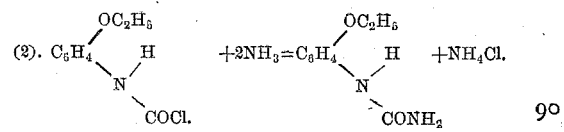

The solvent is now distilled off and the residuum of para-phenetolcarbamide is washed with cold water and crystallized by means of boiling water. The para-phenetolcarbamide forms, when in a state of purity, white needles having a melting point of one hundred and sixty degrees (160°) centigrade, not easily soluble in cold water but readily soluble in hot water, as well as in all ordinary solvents, such as alcohol, ether, benzol and the like. If the para-phenetidine is replaced by the para-anisidine, the corresponding para-anisolcarbamide (which also has a very sweet taste)

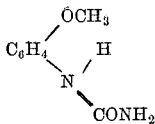

according to the following equations:—

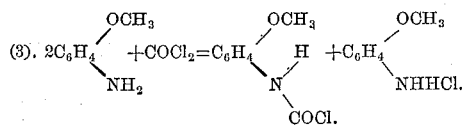

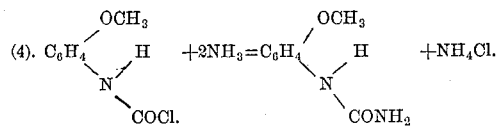

The para-anisolcarbamide forms, in a state of purity, white needles which are readily soluble in hot water and in the usual solvents such as alcohol and ether. Its melting point has been fixed at one hundred and fifty four (154°) centigrade, but it may be remarked that this determination has not been yet verified. The amido-derivatives of these carbamides, which have likewise a sweet taste, are preferably obtained by nitrating these carbamides to their mononitro-derivatives and reducing with tin and hydrochloric acid to convert them into amido-compounds.

I claim as my invention:—

1. A process for making the carbamides of paraphenetol or para-anisol, which consists in treating para-phenetidine or para-anisidine with phosgene, adding ammonia to the product of the reaction and crystallizing the product thus obtained, substantially as described.

2. The new compound which is a carbamide of para-phenetol or para-anisol, having the formula hereinbefore stated, crystallizing in white needles, soluble in alcohol, ether and hot water, and having a sweet taste, substantially as described.

In testimony whereof I have signed my name to this specification in the presence of two subscribing witnesses.

JOSEPH BERLINERBLAU.

Witnesses:
A. MOROZEWICZ,
JOSEF STRUSS.